US010674865B2

(12) United States Patent
Gamberini et al.

(10) Patent No.: US 10,674,865 B2
(45) Date of Patent: Jun. 9, 2020

(54) METHOD, MACHINE AND BOILER FOR THE PREPARATION OF BEVERAGES

(71) Applicant: Eurek S.R.L., Imola (IT)

(72) Inventors: Paolo Gamberini, Imola (IT); Daniele Pasqui, Imola (IT); Maurizio Zaccherini, Imola (IT)

(73) Assignee: Eurek S.R.L., Imola (IT)

( * ) Notice: Subject to any disclaimer, the term of this patent is extended or adjusted under 35 U.S.C. 154(b) by 0 days.

(21) Appl. No.: 15/769,711

(22) PCT Filed: Oct. 24, 2016

(86) PCT No.: PCT/IB2016/056374
§ 371 (c)(1),
(2) Date: Apr. 19, 2018

(87) PCT Pub. No.: WO2017/068553
PCT Pub. Date: Apr. 27, 2017

(65) Prior Publication Data
US 2018/0310755 A1 Nov. 1, 2018

(30) Foreign Application Priority Data

Oct. 23, 2015 (IT) .......................... 102015000064838
Mar. 7, 2016 (IT) .......................... 102016000023658

(51) Int. Cl.
| A47J 31/30 | (2006.01) |
| A47J 31/00 | (2006.01) |
| F24H 1/10 | (2006.01) |
| A47J 31/54 | (2006.01) |
| A47J 31/46 | (2006.01) |
| A47J 31/56 | (2006.01) |

(52) U.S. Cl.
CPC ........... *A47J 31/545* (2013.01); *A47J 31/461* (2018.08); *A47J 31/465* (2013.01); *A47J 31/542* (2013.01); *A47J 31/56* (2013.01)

(58) Field of Classification Search
CPC .................................................. A47J 31/4489
USPC .................................................. 392/480–481
See application file for complete search history.

(56) References Cited

U.S. PATENT DOCUMENTS 4,203,392 A * 5/1980 McLane .................... F22B 9/02
 122/134
4,320,702 A * 3/1982 Shein ...................... A47J 27/04
 122/4 A (Continued)

OTHER PUBLICATIONS

International Search Report and Written Opinion in International Application No. PCT/IB2016/056374, dated Feb. 27, 2017 (10 pages).

*Primary Examiner* — Dana Ross
*Assistant Examiner* — Lawrence H Samuels
(74) *Attorney, Agent, or Firm* — Nixon Peabody LLP

(57) ABSTRACT

Method, machine and boiler for the preparation of beverages, in particular infusions such as coffee or tea; wherein the boiler has a central tank which delimits a superheating area for a liquid and an outer tank positioned around the central tank so as to delimit a heating area for the liquid and to allow the heating of the liquid in the heating area by means of the heat generated in the superheating area; the heating area having a first outlet for supplying hot liquid, the superheating area having a second outlet for the supply of steam.

16 Claims, 4 Drawing Sheets

(56) References Cited

U.S. PATENT DOCUMENTS

| | | | | |
|---|---|---|---|---|
| 4,818,843 | A * | 4/1989 | Swiatosz | A62B 27/00 |
| | | | | 392/397 |
| 8,590,444 | B2 * | 11/2013 | Navarini | A47J 31/002 |
| | | | | 99/280 |
| 9,254,059 | B2 * | 2/2016 | Berto | A47J 31/542 |
| 2008/0216665 | A1 * | 9/2008 | Hoehne | A47J 31/4485 |
| | | | | 99/293 |
| 2009/0310951 | A1 * | 12/2009 | Capraro | A47J 31/542 |
| | | | | 392/465 |
| 2012/0070552 | A1 * | 3/2012 | Navarini | A47J 31/002 |
| | | | | 426/433 |
| 2012/0261102 | A1 * | 10/2012 | Hebert | F28D 15/00 |
| | | | | 165/129 |
| 2013/0055902 | A1 * | 3/2013 | Berto | A47J 31/542 |
| | | | | 99/281 |
| 2015/0059586 | A1 * | 3/2015 | Pirker | A47J 31/54 |
| | | | | 99/295 |
| 2015/0064323 | A1 * | 3/2015 | Prefontaine | A47J 31/46 |
| | | | | 426/433 |

\* cited by examiner

METHOD, MACHINE AND BOILER FOR THE PREPARATION OF BEVERAGES

CROSS-REFERENCE TO RELATED APPLICATIONS

This application is a U.S. national stage of International Application No. PCT/IB2016/056374, filed Oct. 24, 2016, which claims the benefit of and priority to Italian Patent Application No. 102016000023658, filed Mar. 7, 2016, and Italian Patent Application No. 102015000064838, filed Oct. 23, 2015, each of which is hereby incorporated by reference herein in its entirety.

TECHNICAL FIELD

The present patent application relates to a method, a machine and a boiler for the preparation of beverages, in particular infusions such as coffee or tea.

BACKGROUND ART

It is known, for the preparation of hot drinks such as coffee or tea, to use machines comprising an infusion circuit in which the water is heated to a temperature of about 90 degrees Centigrade or more, and is injected into an infusion chamber containing the infusion product. The infusion product may be, for example, in the form of powder or leaves, or contained inside capsules or tablets.

Machines of the type described above, in particular for professional use in bars, have the disadvantage of using boilers for heating a liquid, in particular water, for the preparation of a plurality of different beverages that require different quantities of hot liquid. For example, boilers of professional machines of known type heat water for the preparation of tea or coffee; it is therefore known to use boilers with a tank configured to heat several litres of water, in order to ensure operation even at full machine load for long periods of time so as to avoid creating long waiting times. This inevitably causes a great waste of energy, since it is necessary to keep the boiler in constant operation to prevent the liquid contained in it cooling down. In some cases, machines of the professional type described above are kept switched on even during the night when they are not in use, to avoid cooling and long start-up times in the morning.

Furthermore, machines of the known type have the disadvantage that the boilers maintain their own internal hot water at a temperature close to boiling point to also allow the production of steam for creating foaming liquids such as cream or milk. Therefore, the water contained for prolonged times in these boilers has the disadvantage that the salts in the water contained in the tank precipitate towards the bottom of the boiler and therefore there is water rich in mineral salts at the bottom of the boiler and water free of mineral salts in the upper part. This diminishes the organoleptic properties of the water and consequently also the taste and the final quality of the infusion.

DISCLOSURE OF INVENTION

The purpose of the present invention is to provide a machine for the preparation of beverages, in particular of the professional type, which is able to significantly reduce operating costs, to reduce energy consumption of machines of the professional type, while at the same time maintaining the response time of the machine.

The purpose of the present invention is to provide a machine that can provide the liquid at a given temperature with a high degree of precision, in other words that the difference between the actual temperature and the desired temperature of the liquid is limited to ensure the desired organoleptic properties of the beverages, for example tea.

The purpose of the present invention is to provide a machine for the preparation of beverages, in which the water for the preparation of infusions, such as tea, is not in direct contact with a resistive heating element, this prevents the liquid from boiling and ensures the maintenance of the organoleptic properties of the water for the preparation of the infusion and consequently the final quality of the infusion. Moreover, a purpose of the present invention is to provide a machine for the preparation of infusions wherein however the generation and prompt distribution of steam proper for preparing foaming liquids is ensured.

A method, a machine and a boiler for the preparation of beverages are provided according to the present invention as cited in the appended claims.

BRIEF DESCRIPTION OF THE DRAWINGS

The invention will now be described with reference to the accompanying drawings which illustrate a non-limiting embodiment example, wherein.

BEST MODE FOR CARRYING OUT THE INVENTION

Figure 1:
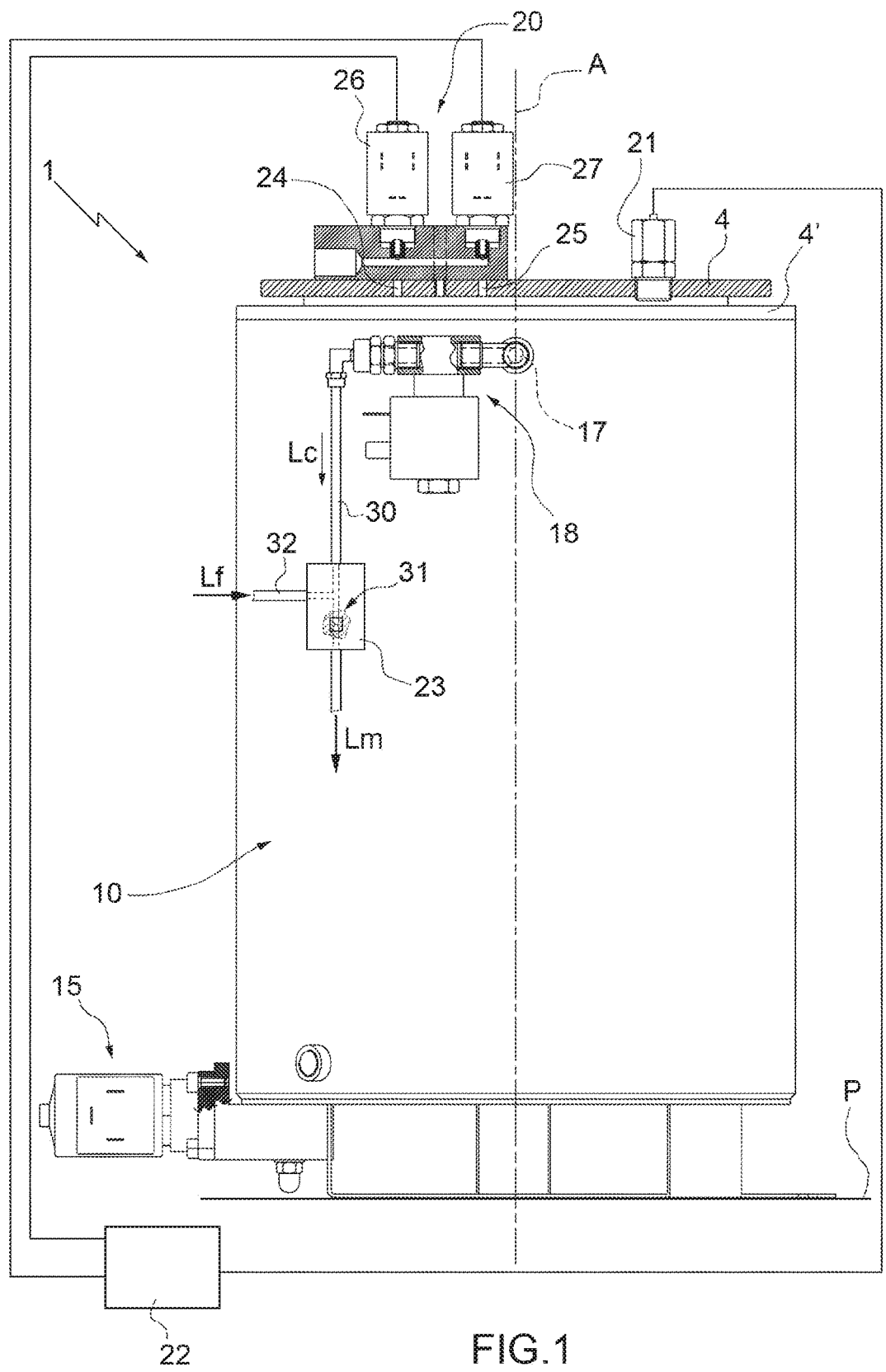
FIG. 1 is a main view of a boiler according to the present invention.
Figure 2:
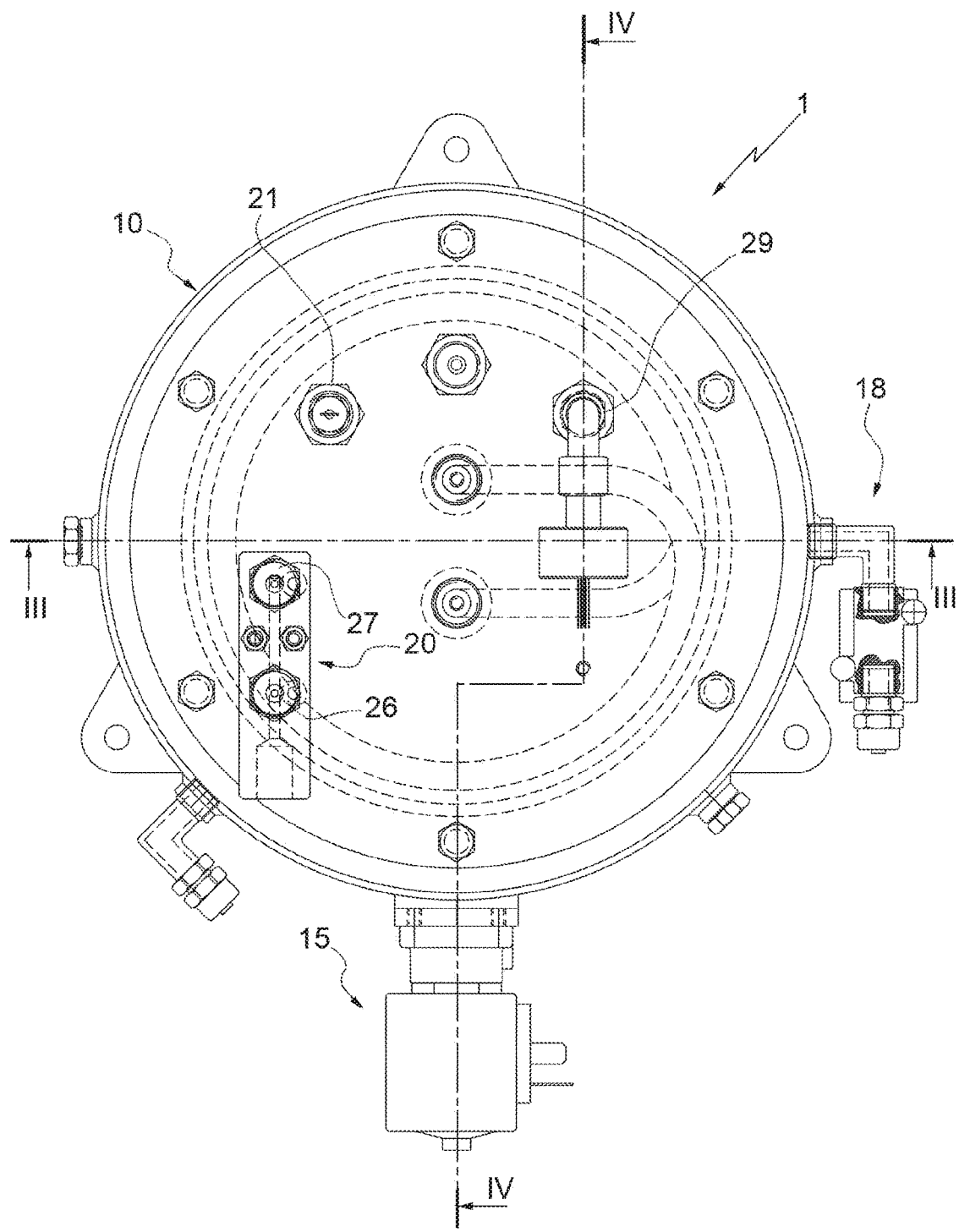
FIG. 2 is a top view of the boiler of FIG. 1.

Number 1 in FIG. 1 indicates as a whole a boiler 1 for dispensing hot liquid Lc, for example for the preparation of infused beverages such as tea. Advantageously, the boiler 1 has the dual function of heating the liquid, for example water, for the preparation of beverages, and at the same time, for the separate generation of steam V proper to prepare foaming liquids such as cream or milk.

Figure 3:
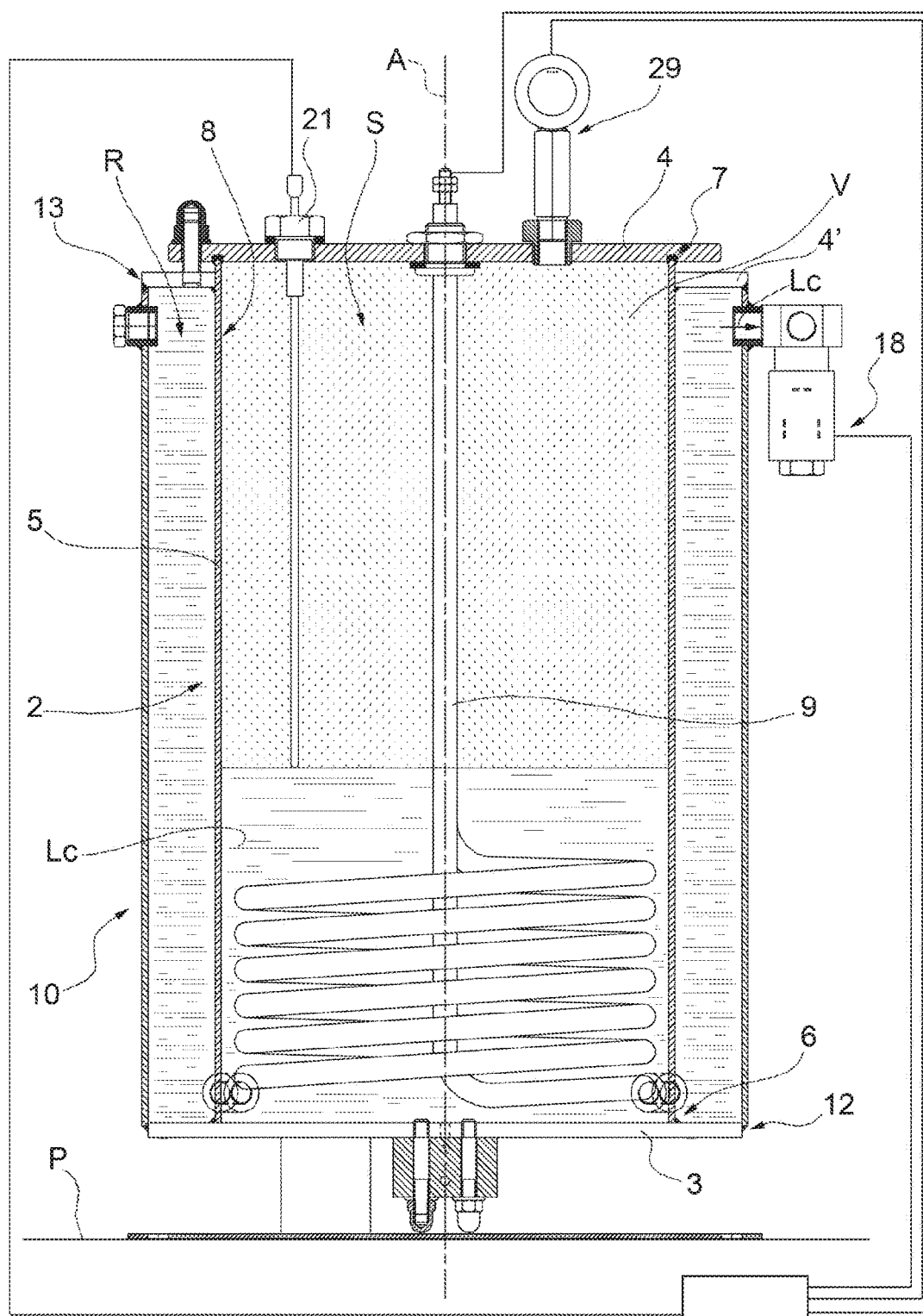
FIG. 3 shows a section along the line III-III of FIG. 2.
Figure 4:
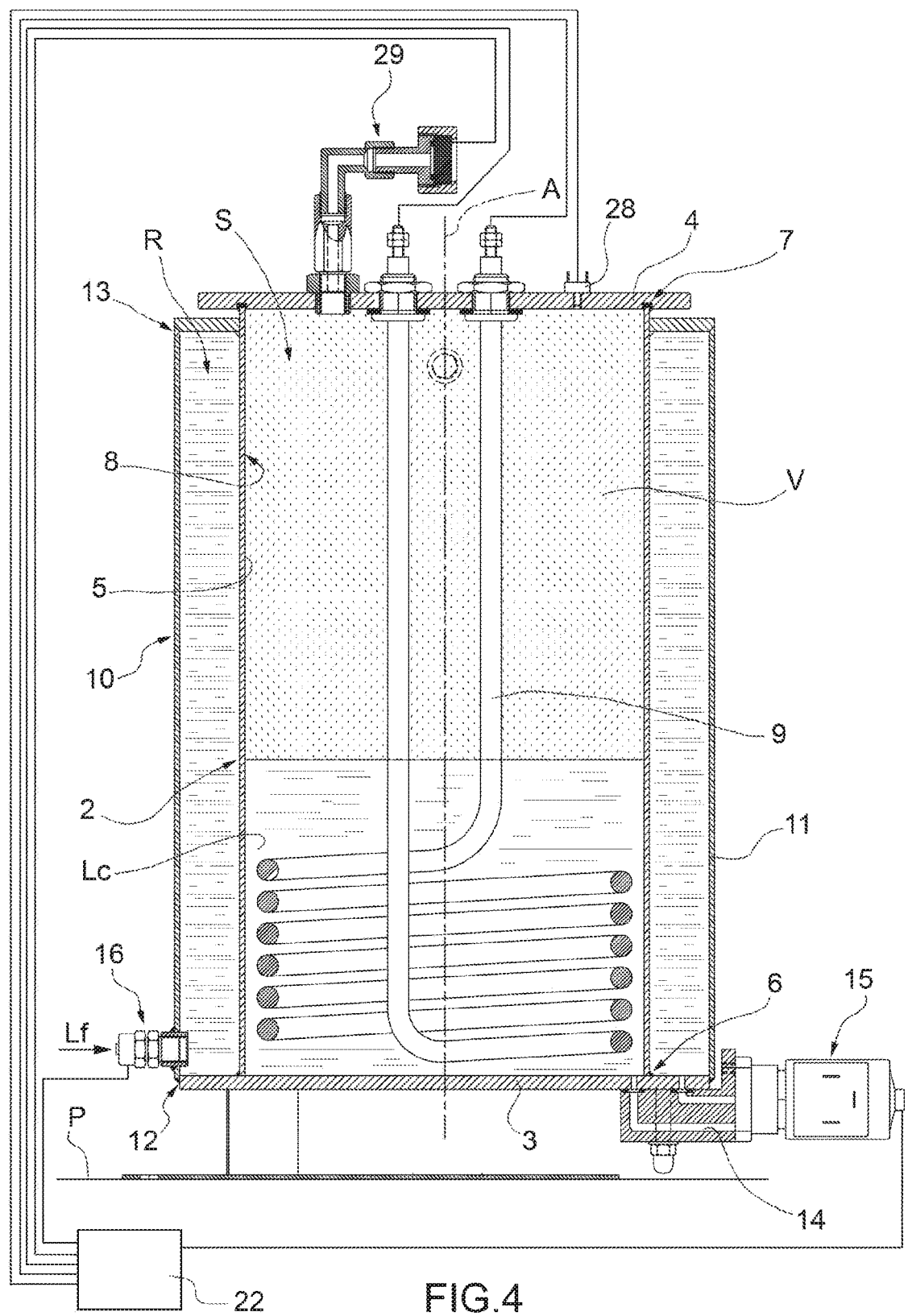
FIG. 4 shows a section along the line IV-IV of FIG. 2.

As shown in detail in FIGS. 3 and 4, the boiler 1 comprises a central tank 2. The central tank 2 comprises an inner tubular body 5 with a longitudinal axis A.

According to the example shown in the figures, the boiler 1 comprises a bottom wall 3 which is configured to be positioned parallel to a supporting plane P and a head wall 4 substantially parallel to the bottom wall 3. The central tank 2 is substantially delimited by the inner tubular body 5 which is hermetically secured at one end of the bottom. 6 to the bottom wall 3 and, in correspondence with one end of the head 7 to the head wall 4. The bottom wall 3, the inner tubular body 5 and the head wall 4 define an inner cavity 8 of the boiler 1, in particular of the central tank 2.

As will be explained in greater detail below, the inner cavity S defines a superheating area S of the boiler 1. Advantageously, the superheating area S is configured to produce steam V.

The boiler 1 also comprises a heating body 9.

The heating body 9 is a body coil, of known type and shown schematically, and extends inside the inner cavity 8 of the central tank 2 along the longitudinal axis A, a portion of the coil preferably occupying part of the bottom of the central tank 2 itself.

The boiler 1 also comprises an outer tank 10.

The outer tank 10 comprises an outer tubular and concentric body 11. The outer tank 10 is configured to delimit, together with the central tank 2, a heating area R configured to heat the liquid and avoid boiling of the same by keeping it under pressure.

In particular, the outer tubular body 11 is configured to enclose within it the inner tubular body 5. The outer tubular body 11 is hermetically attached to the bottom wall 3 at its own bottom end 12 and, respectively, with the head wall 4 at one end of the head 13. The outer tubular body 11, the inner tubular body 5, the bottom wall 3 and an annular head wall 4' substantially delimit the outer tank 10. The annular head wall 4' and the head wall 4 are formed with two separate bodies for ease of assembly and maintenance.

In particular, the heating area R substantially relates to the annular portion of the boiler 1 included radially between the inner tubular body 5 and the outer tubular body 11. In other words, as illustrated in the figures, the heating area S is laterally delimited by the bottom wall 3, the head wall 4, the outer tubular body 11 and the inner tubular body 5.

The boiler 1 also comprises a connecting tube 14 (illustrated in FIG. 4) which puts the bottom of the heating area R into fluid connection with the bottom of the superheating area S. The boiler 1 comprises flow regulating valve members 15 installed along the connecting tube 14 configured to regulate the flow of the hot liquid Lc from the heating area R to the superheating area S. For example, the valve members 15 comprise a two-way valve and are configured to allow the passage of hot liquid Lc from the heating area R to the superheating area S.

The boiler 1 also comprises a cold liquid supply Lf installed on the outer wall of the outer tank 10 near the bottom of the outer tank 10 itself. As illustrated in the figures, the liquid supply is connected (in known manner and illustrated schematically) to the outer tubular body 11 and near the bottom wall 3 in order to supply cold liquid Lf to the heating area R and at the bottom wall 3 of the boiler 1. The connecting tube 14 preferably faces the inside of the heating area R in a diametrically opposite position with respect to the supply 16.

The boiler 1 also comprises an outlet 17 for hot liquid. Lc installed on the outer tubular body 11 of the outer tank 10 near the head wall 4. As illustrated in the figures, the outlet 17 is connected to the outer tubular body 11 and is adjacent to the head wall 4 so as to allow the release of hot liquid Lc from the heating area R and in the vicinity of the head wall 4.

Advantageously, the boiler 1 comprises a valve body 18, which is connected to the heating area R by means of the outlet 17. The valve body 18 is configured to adjust the output flow of hot liquid Lc from the heating area R. Advantageously, the valve body 18 is configured to avoid, in cooperation with the supply 16 of cold liquid Lf, pressure drops in the heating area R during the drawing off of hot liquid Lc. As illustrated in the figures, the valve body 18 is a two-way electrically-operated valve. Advantageously, the boiler 1 comprises a mixer 23, which is configured to mix the cold liquid Lf drawn from outside, in known manner not shown, with the hot liquid Lc exiting the heating area R through an outlet conduit 30, so as to obtain liquid for the preparation of infusions at a desired temperature. Advantageously, the mixer 23 comprises a choke nozzle 31 (shown in FIG. 1), which is positioned along the outlet conduit 30 and is configured to prevent excessive outflow of hot liquid Lc from the outer tank 10 and a consequent sudden lowering of the pressure of the liquid contained in the heating area R.

Advantageously, the mixer 23 comprises a supply conduit 32 for cold liquid Lf, which is configured to supply cold liquid Lf to the outlet conduit 30 upstream of the choke nozzle 31, in accordance with the output direction of the hot liquid Lc. The cold liquid delivered into the outlet conduit 30 thus has the dual function of both preventing a lowering of the pressure in the heating area R and cooling the hot liquid Lc so as to provide users with liquid at an optimum and desired temperature for the making of a beverage.

The boiler 1 also comprises valve members 20, of known type, for distributing outside the superheating area S of the central tank 2 the steam. V generated therein.

Advantageously, the boiler 1 comprises two outlet conduits 24 and 25 for steam V. Each conduit allows the passage of a respective flow of steam V out of the superheating area S. The boiler 1 comprises in particular, a valve 26 for regulating the passage of steam V through the outlet conduit 24 and, respectively, a valve 27 for regulating the passage of steam V through the outlet conduit 25.

According to a variant not shown, the boiler 1 may comprise a different number of outlet conduits 24, the number of outlet conduits 24 depending on the different flow rates of vapour V producible by the boiler 1.

The boiler 1 also comprises a level detecting system 21 for the level of hot liquid Lc in the central tank 2. The boiler 1 also comprises a control unit 22 connected: with the level detecting system 21, with the cold liquid supply 16 and with the valve members 15 for regulating the flow between the heating area R and the superheating area S.

The boiler 1 also comprises a temperature sensor 28 which is configured to detect the temperature in the superheating area S. The main function of the temperature sensor 28 is control and safety by stopping operation of the boiler 1 if the temperature exceeds predefined values.

The boiler 1 also comprises a pressure sensor 29 which is configured to detect the pressure in the superheating area S. In particular, the pressure sensor 29 faces the inside of the superheating area S via the head wall 4.

In use, the superheating area S is partially filled with hot liquid Lc and the heating area R is completely filled with liquid. The heating body 9 is then activated so as to bring the temperature in the central tank 2 up to the boiling point of the liquid so as to have in the superheating area S a bottom part of the superheating area S filled with hot liquid Lc and an upper part of the superheating area. S filled with steam V.

The heat present in the superheating area S is transmitted to the liquid present in the heating area R, which is thus heated.

When steam V is required, the valve members 20, in particular the valves 26 and 27 for the distribution of steam V are actuated individually or simultaneously so as to allow the outflow of steam V through the respective conduit 24 and/or 25. The type and the number of valves 26 and/or 27 actuated determines the flow rate of steam V output.

In use, when the steam V is made to exit from the superheating area S, the pressure in the superheating area S itself falls. The pressure sensor 29 therefore detects the drop in pressure in the superheating area S and sends the data in known way to the control unit 22. By detecting the use of steam V, the control unit 22 then adjusts the operation of the liquid supply 16 and the valve members 15 so as to top up both the central tank 2 and the outer tank 10.

In other words, the level of hot liquid Lc in the superheating area S is adjusted on the basis of usage requirements by means of the control unit 22. In particular, the control unit 22 adjusts the opening of the valves and allows the passage of liquid from the heating area R to the superheating area S so as to top up the superheating area S itself.

Advantageously, supplying the superheating area S with hot liquid Lc withdrawn from the heating area R avoids thermal damping of the superheating area S itself and consequently improves the thermal efficiency of the boiler 1.

When hot liquid Lc is required for the preparation of a beverage such as tea, the outlet 17 of the outer tank 10 is opened to allow the distribution of hot liquid LC present in the upper part of the heating area R. The outer tank 10 is always kept full and under pressure by means of the supply in known manner by command of the control unit 22 in such a way that the hot liquid Lc present in the heating area R never exceeds boiling point.

The boiler 1 of the type described above has the advantage of allowing rapid generation of steam V and hot liquid Lc, to save energy and to provide a better thermal efficiency than boilers of known type, since part of the heat is used to pre-heat the liquid to be supplied to the superheating area S. Moreover, the boiler 1 of the type described above makes it possible to draw the hot liquid Lc for the preparation of beverages and the steam V from two areas which are separate and distinct from the boiler 1 itself. This has the benefit that the hot liquid Lc used for the preparation of beverages has never exceeded boiling point and has kept intact its salt content and organoleptic properties. A boiler 1 of the type described above thus enables production of infusions of higher quality than those made by traditional boilers in which exceeding boiling temperatures for prolonged operating periods causes precipitation of mineral salts.

The invention claimed is:

1. A boiler comprising:
    a central tank configured to store a liquid therein, the central tank defining a superheating area for storing steam generated from the liquid stored in the central tank, the superheating area having a first outlet configured to supply at least a portion of the steam for use in the preparation of a beverage; and
    an outer tank surrounding the central tank, the outer tank being configured to store the liquid therein and defining a heating area, the heating area having a second outlet configured to supply heated liquid for use in the preparation of the beverage;
    wherein the surrounding arrangement of the outer tank and the central tank causes the heating area to surround the superheating area such that the heating area is configured to receive heat directly from the superheating area heat through a body of the central tank.

2. The boiler of claim 1, wherein the second outlet for the supply of heated liquid and the first outlet for the supply of steam draw, respectively, liquid and steam from two distinct and separate areas of the boiler.

3. The boiler of claim 1, wherein the second outlet for the supply of heated liquid is configured to draw liquid from an area in which the liquid is stored below a boiling point.

4. The boiler of claim 1, further comprising:
    a liquid supply for the supply of liquid to the outer tank;
    a valve body configured to allow the release of heated liquid from the heating area; and
    a control unit connected both to the liquid supply and to the valve body,
    wherein the control unit is configured to adjust, in use, the opening of the valve body and the flow rate of the liquid supply so as to keep the liquid contained in the outer tank pressurized.

5. The boiler of claim 4, further comprising a pressure sensor configured to detect a pressure of the steam in the central tank.

6. The boiler of to claim 1, further comprising a connecting tube which puts the heating area and the superheating area into fluid communication and a valve configured to adjust the flow of heated liquid from the heating area to the superheating area.

7. The boiler of claim 1, wherein the central tank comprises a level detecting system which is configured to detect a level of heated liquid in the central tank.

8. The boiler of claim 1, further comprising valve members connected to the first outlet and configured to regulate the outflow of steam from the central tank.

9. The boiler of claim 1, wherein the valve body comprises a mixer configured to mix the heated liquid exiting the outer tank with another fluid.

10. The boiler of claim 1, wherein the boiler is part of a machine for the preparation of coffee.

11. The boiler of claim 1, further comprising a bottom wall and a head wall, wherein a first end of the central tank is coupled to the bottom wall and a second end of the central tank is coupled to the head wall.

12. The boiler of claim 11, wherein a first end of the outer tank is coupled to the bottom wall.

13. The boiler of claim 1, wherein the central tank has a generally cylindrical shape and the outer tank has a generally annular shape.

14. The boiler of claim 1, further comprising a cold liquid supply configured to supply cold liquid to the heating area of the outer tank.

15. The boiler of claim 1, further comprising a temperature sensor configured to detect a temperature of the superheating area.

16. The boiler of claim 1, further comprising a pressure sensor configured to detect a pressure of the superheating area.

* * * * *